United States Patent [19]

Sanford

[11] Patent Number: 5,252,402
[45] Date of Patent: Oct. 12, 1993

[54] MIRRORBACK COATING

[75] Inventor: Timothy J. Sanford, Randolph, N.Y.

[73] Assignee: Lilly Industries, Inc., Indianapolis, Ind.

[21] Appl. No.: 907,729

[22] Filed: Jul. 2, 1992

Related U.S. Application Data

[62] Division of Ser. No. 770,228, Oct. 2, 1991, Pat. No. 5,156,917, which is a division of Ser. No. 463,424, Jan. 11, 1990, Pat. No. 5,075,134.

[51] Int. Cl.$^5$ .................. B32B 15/08; B32B 17/06; B32B 27/18; B32B 33/00

[52] U.S. Cl. .................. 428/425.8; 106/14.34; 106/14.37; 106/14.42; 252/389.1; 252/394; 428/418; 428/458; 428/460; 428/461; 428/467; 428/470

[58] Field of Search .............. 106/14.34, 14.37, 14.42; 428/912.2, 418, 425.8, 458, 460, 461, 467, 470; 252/389.1, 394

[56] References Cited

U.S. PATENT DOCUMENTS

| | | | |
|---|---|---|---|
| 2,103,538 | 11/1934 | Kolb | 88/105 |
| 2,523,626 | 9/1950 | Jones | 260/6 |
| 2,856,818 | 10/1958 | Woodberry | 88/105 |
| 3,293,075 | 12/1962 | Wildi | |
| 3,909,200 | 9/1975 | Redmore | 21/2.7 |
| 4,253,886 | 3/1981 | Aonuma et al. | 148/105 |
| 4,292,190 | 9/1981 | Davis et al. | 252/75 |
| 4,581,422 | 4/1986 | Speranza et al. | 525/504 |
| 4,645,714 | 2/1987 | Roche et al. | 428/458 |
| 4,659,779 | 4/1987 | Bagga et al. | 525/118 |
| 4,666,264 | 5/1987 | Yamabe | 350/641 |
| 4,707,405 | 11/1987 | Evans et al. | 428/336 |
| 4,745,003 | 5/1988 | Sirkoch et al. | 427/54.1 |
| 4,758,638 | 7/1988 | Hickner et al. | 525/510 |
| 4,780,372 | 10/1988 | Tracy et al. | 428/428 |
| 4,873,139 | 10/1989 | Kinosky | 428/341 |
| 4,880,668 | 11/1989 | Hayes et al. | 427/162 |
| 5,075,134 | 12/1991 | Sanford | 427/165 |
| 5,156,917 | 10/1992 | Sanford | 428/426 |

FOREIGN PATENT DOCUMENTS

| | | |
|---|---|---|
| 0318963 | 11/1988 | European Pat. Off. |
| 0359437 | 8/1989 | European Pat. Off. |
| 40-2612 | 2/1965 | Japan |
| 55-18472 | 2/1980 | Japan |
| 55-100501 | 7/1980 | Japan |
| 59-62369 | 4/1984 | Japan |
| 1074076 | 8/1965 | United Kingdom |
| 1449871 | 3/1975 | United Kingdom |

OTHER PUBLICATIONS

Aero Dicyandiamide, published by Cyanamid Canada, Inc. In Preparation, published by SKW Trostberg AG.

*Primary Examiner*—James C. Cannon
*Attorney, Agent, or Firm*—DeLio & Peterson

[57] ABSTRACT

A composition capable of being applied as a film and hardening to form a protective layer on the back of a mirror comprises a fluid organic resin and a corrosion inhibitor selected from the group consisting of dicyandiamide and metal or acid salt thereof. The organic resin may be any thermoplastic or thermosetting resin suitable for coating the reflective and other metallic layers of the mirror. Exemplary resins include alkyd resins, acrylic resins, modified alkyd resins, polyesters, urethane oils, vinyl halide polymers or copolymers, oleoresinous varnishes, nitrocellulose compositions, phenol-formaldehyde resin varnishes, and epoxy resins. Preferably, the resin is an alkyd or modified alkyd resin. The dicyandiamide or metal or acid salt of dicyandiamide may be present in an amount from about 0.1 to 20 weight percent, preferably 0.5 to 10 weight percent, of the organic resin coating system. The resin system should be essentially free of lead and lead salts. To inhibit the corrosion of metallic film layers on mirrors, a mirror having a glass substrate layer and a metallic film layer thereover should be obtained, after which the fluid organic resin coating system containing the dicyandiamide or metal or acid salt of dicyandiamide corrosion inhibitor is applied over the metallic film layer. The organic resin coating system is then hardened to produce the protective coating layer over the metallic layer. Other articles having metallic surfaces may also be protected by the dicyandiamide-containing resin system of the present invention.

43 Claims, No Drawings

MIRRORBACK COATING

This is a divisional of co-pending application, Ser. No. 770,228 filed on Oct. 2, 1991, now U.S. Pat. No. 5,156,917 which is a divisional of application Ser. No. 463,424, filed Jan. 11, 1990 now U.S. Pat. No. 5,075,134.

BACKGROUND OF THE INVENTION

This invention relates to a coating for use on mirror backs, and, in particular, to a lead-free organic coating to be applied to the metallic film layer on the back of a mirror to protect the metallic layer and prevent corrosion thereof.

Typical mirrors are made of a glass sheet and a thin layer of a metallic film applied to the back of the sheet. The metallic film layer adhered directly to the glass is usually a film of silver, although other metallic films may also be used, such as copper. When silver is used as the primary reflective layer, it is commonly protected by a second metallic film layer of copper or some other metal.

It has long been known to employ various paints and other film-forming organic resins as a further protective layer over a metallic film layer to protect the layer from corrosion and physical damage. Traditionally, these paints have included lead-based corrosion inhibitors, such as lead salts. However, in recent times, both users and producers of such paint products have sought to eliminate the use of lead and lead compounds for health and environmental reasons. A recent effort in this direction is reflected in U.S. Pat. No. 4,707,405 to Evans et al directed to use of cyanamide salts of non-lead metals as corrosion inhibitive pigments in mirror back coatings. This patent discloses the use of such non-lead cyanamide salts as calcium cyanamide and zinc cyanamide in various types of film-forming thermosetting or thermoplastic resins which are applied over the silver and copper layers on the backs of mirrors. Continuing efforts have been made to produce an effective lead-free corrosion inhibiting mirror back coating to satisfy the long felt need of the industry, but to date, no such commercial coatings have proven to be as effective in inhibiting corrosion and overall protection as lead containing coatings.

Bearing in mind the problems and deficiencies of the prior art, and the long felt need of industry, it is therefore an object of the present invention to provide an effective corrosion inhibiting, lead-free coating for covering the metallic film layers on the back of a mirror.

It is another object of the present invention to provide an organic film-forming resin which incorporates a non-lead corrosion inhibitor which can be easily applied by existing techniques to mirror backs.

It is a further object of the present invention to provide a lead-free paint for protecting thin silver and/or copper or other metallic film layers which imparts corrosion protection of equal to or greater effectiveness than prior art lead containing paints.

It is yet another object of the present invention to provide an effective process for inhibiting corrosion of metallic film layers on mirrors.

It is a further object of the present invention to provide mirror and other articles having effective protection of their metallic film layers against salt spray and other corrosion-causing compounds.

SUMMARY OF THE INVENTION

The above and other objects, which will be apparent to those skilled in the art, are achieved in the present invention which provides a composition comprising a paint or other fluid organic resin coating system capable of being applied as a film and hardened to form a protective layer, the resin additionally containing a corrosion inhibitor selected from the group consisting of dicyandiamide and metal or acid salts thereof. The term "hardened" is used to mean that the coating system can be cured if the resins are thermosetting or dried if the resins are thermoplastic. The organic resin employed in the coating system can be any thermoplastic or thermosetting resin suitable for coating a metallic layer such as that found on the back of a mirror. Exemplary resins include alkyd resins, acrylic resins, acrylic and other modified alkyd resins, polyesters, urethane oils, vinyl halide polymers or copolymers, oleoresinous varnishes, nitrocellulose compositions, phenol-formaldehyde resin varnishes, and epoxy resins. Preferably, the resin is an alkyd or modified alkyd resin, more preferably an acrylic-alkyd copolymer phenolic resin system.

The dicyandiamide or metal or acid salt of dicyandiamide may be present in an amount from about 0.1 to 20 weight percent, preferably about 0.5 to 10 weight percent, of the organic resin coating system (including resins, solvents and other additives). Preferably, the organic resin should be essentially free of lead and lead salts, either as corrosion inhibitors or other components.

To inhibit the corrosion of metallic film layers on mirrors, a mirror having a glass substrate layer and a metallic film layer thereover should be obtained, after which the fluid organic resin coating system containing the dicyandiamide or metal or acid salt of dicyandiamide corrosion inhibitor is applied over the metallic film layer. The organic resin coating system is then hardened to produce a protective coating layer over the metallic layer.

The preferred mirror article contains, in sequence, the glass substrate, the metallic film layer(s) which may be silver and/or copper or some other metal, and the hardened organic resin system as described above. Preferably, the mirror has a thin layer of silver film attached directly to the glass layer as the reflective layer, a thin protective layer of a copper film over the silver layer, and the hardened coating system described above directly over the copper film layer as the primary corrosion inhibitor layer. Other articles having metallic surfaces may be protected by the dicyandiamide-containing resin systems described above as well.

DETAILED DESCRIPTION OF THE INVENTION

The mirrors and metallic film layers on which the coating of the present invention has been found to be particularly useful are those in which one or more layers of silver and/or copper films have been applied to a glass substrate, although the coating may also be useful over film layers of other metals as well. Preferably, the mirror consists of a substrate layer of glass and a layer of reflective silver or copper film applied to the rear surface of the glass. If a silver film is applied directly to the glass, it is common to apply a second film layer of copper over the silver to provide protection against corrosion and physical damage to the silver layer. Such metallic film layers are relatively thin and on the order of approximately 700 angstroms for the silver layer and approximately 220 angstroms for the copper layer.

Such mirrors may be made by any of the known processes in the prior art. The glass surface to which the metallic film layer is to be applied is usually lightly polished and cleaned and thereafter sensitized with an aqueous stannous chloride solution. The silver film layer may be deposited on the sensitized glass surface by one of many methods such as that described in U.S. Pat. No. 4,737,188 to Bahls, the disclosure of which is hereby incorporated by reference, in which an N-methylglucamine reducer is utilized with ammoniacal silver nitrate and a strong base such as sodium hydroxide in aqueous solutions sprayed on and combined at the sensitized glass surface to deposit the silver film. Thereafter, a copper film may be applied to and over the silver film by any one of a variety of prior art procedures such as a galvanic process which utilizes aqueous suspensions of iron and copper powder or by the disproportionation of cuprous ions on the silver surface. The latter process is described in U.S. Pat. No. 3,963,842 to Sivertz et al, the disclosure of which is hereby incorporated by reference. In such process, a cupric tetraammonium sulfate solution is reduced by combination with hydroxylamine sulfate and thereafter reacted with an activator-modifier such as a mixture of citric acid or ethylene diamine and $H_2SO_4$ to form a copper film on the silvered surface.

The coating of the present invention to be applied over the copper, silver or other metallic film layer is based on any suitable thermosetting or thermoplastic organic film-forming resin. The thermosetting resins contemplated in use in the present invention are those that require heat to effect curing, such as by infrared heating, although room temperature air drying resins are also included.

Suitable resins include alkyd resins, acrylic resins, polyesters, urethane oils, vinyl halide polymers or copolymers, oleoresinous varnishes, nitrocellulose compositions, phenol-formaldehyde resin varnishes, epoxy resins, or combinations of such resins. Preferably, the resins employed in the present invention are alkyd or modified alkyd resins such as acrylic-alkyd copolymers in combination with a solvent, and other additives such as a pigment, if desired, to produce a resin coating system. Such alkyd resin systems may be modified with acrylics, urethanes and polyurethanes, phenolics, and combinations of the above. More preferably, the resins may be acrylic-alkyd copolymers and phenolic resins in combination. Amino crosslinking agents such as melamine-formaldehyde resins and/or urea-formaldehyde resins may be included in the modified alkyd or other resin system to make the system heat-curable. Alternatively, metal driers can be employed in the system to make it air drying.

The resin system of the present invention should employ a binder resin which casts a suitable film and provides good adhesion to and over the aforementioned metallic film layer(s). The system may employ a suitable solvent of the type normally employed in the particular resin system. For example, in the preferred alkyd and modified alkyd resin systems of the present invention, an ester such as propylene glycol monomethyl ether acetate, butyl acetate or isobutyl acetate may be employed. Preferably, the alkyd or modified alkyd resins comprise 20 to 50 percent by weight of the system, more preferably 20 to 35 weight percent. The solvents or solvent blends employed in this system are preferably 20 to 35 percent by weight of the system. Additives normally employed in resin coating systems for this type of application may also be added in addition to the resin and solvent, for example, pigments (where it is desired to impart a color) and inert fillers or extenders such as barytes or calcium carbonate; flow additives; anti-settling agents to support any dense pigment particles; catalysts such as blocked or unblocked acids (where a thermosetting resin is employed); surface active agents; antiskinning agents such as methyl ethyl ketoxime; and additives for other purposes.

The aforementioned resin systems are by themselves fully hardenable to form a film over a metallic film layer. To impart effective corrosion resistance for the metallic film layer, the present invention specifically contemplates the use of a compound selected from the group consisting of dicyandiamide (also known as "cyanoguanidine"), metal or acid salts thereof, or combinations of the above. Unless specified otherwise, references herein to use of dicyandiamide shall also apply to metal or acid salts of dicyandiamide, in connection with the corrosion inhibitor of the present invention. The dicyandiamide may be employed in a range from about 0.01 to about 20% by weight of the resin coating system, although the range from about 0.1 to about 10% is preferred. More preferably, a range from about 0.5-1% to about 5% is employed for maximum effectiveness. At the higher amounts, particularly above 10%, the dicyandiamide becomes particularly susceptible to reaction with water, for example, any moisture present in the environment. If such higher amounts of the dicyandiamide are employed in the resin coating system of the present invention, it is preferred that an additional water or moisture proof coating be applied over the hardened resin coating. The dicyandiamide may be blended with the resin system by comminuting it into fine particles, preferably from 10 to 20 microns or less in size. It has been found that when the small size particles are employed, a lower overall weight percentage of dicyandiamide is needed to achieve a desired level of corrosion protection, since the smaller particle size can be dispersed throughout the resin to a greater extent to provide the necessary protection. Alternatively, the dicyandiamide may be dissolved in a suitable solvent and dispersed and blended into the resin system.

While not wishing to be limited by theory, it is thought that the dicyandiamide reacts in the present system to: 1) passivate the metallic film on which it is applied, for example, a copper film, and create a complex with the metal to reduce corrosion; 2) increase the adhesion of the metal film, such as copper, to the cured resin; or 3) a combination of 1 and 2 above.

The dicyandiamide corrosion inhibitor is incorporated instead of utilizing conventional lead based pigments, such as lead salts, employed in the past. However, other corrosion inhibitors may be used in conjunction with the dicyandiamide, such as zinc oxide, to provide a desired degree of protection in a specific application. If desired, low amounts of leaded materials which comply with environmental laws and regulations may be added to the resin system. Preferably, the blended resin system to be applied over the aforementioned metallic films is completely free of lead to comply more easily with environmental laws and regulations in its manufacturing and use.

The blended resin system employing the dicyandiamide and/or its metal or acid salts is applied to the metallic layers on the mirror backs by conventional processes, such as air or airless spraying (preferably the latter), roller coating, or curtain coating. Thermosetting resin systems such as the aforementioned preferred alkyd or modified alkyd resin systems may be dried by infrared heating, typical conditions being five minutes heating time with an exit film temperature of about 250° F. (120° C.). The thickness of the dried resin film layer may be up to 0.002 in. (51 microns) thick, although it is preferred that the film thickness be from about 0.001 to 0.0015 in. (25 to 38 microns) in thickness. Where thicker coatings are desired, multiple layers of the coating may be applied. The use of the thin layers described above enables the applied resin system to be quickly dried to a hardened layer without causing bubbles or other defects. The resin system incorporating the dicyandiamide of the present invention provides good protection to the edges of the mirror metallic film layers, at which location corrosion usually commences. Mirror edge corrosion (also known as "black edge") can occur because of moisture present in bathrooms or other high humidity environments. Other causes include the use of certain adhesives in which a component (for example, acetic acid in silicone based adhesives) can attack the resin coating layer and metallic film. Also, where the edges of the mirrors are bevelled or polished with an abrasive, abrasive coolant having a high pH level can remain on the edge and attack the paint and metallic film layers of the mirror.

In addition to providing good corrosion protection, the resin coating system employing the dicyandiamide of the present invention should be able to provide a smooth finish having a good appearance, and, if the mirror is later cut or otherwise handled, should prevent chipping of the resin paint at the mirror edges.

The following non-limiting examples are provide to illustrate resin systems employing dicyandiamide of the present invention.

EXAMPLES

A series of glass panels were cleaned, sensitized, and coated with successive layers of a silver film and a copper film according to the processes described above. The resulting silver film layer was approximately 700 angstroms thick and the resulting copper film top layer was approximately 220 angstroms thick.

Mirror back paint coatings to be applied over the silver and copper layers were prepared by mixing starting compositions A and B as follows (components reported in parts by weight):

| Component | Composition A | B |
|---|---|---|
| acrylic-alkyd copolymer (Freeman Chemical Chempol 13-1214) | 20.4 | 36 |
| phenolic resin solution (44.5% Union Carbide Corp. Ucar CK2400; 22.2% mineral spirits; 22.2% butyl alcohol; 11.1% xylene) | 10.9 | — |
| carbon black (Pfizer Superjet LB-1011) | 0.8 | — |
| barium sulfate (Thompson Weiman Barimite XF) | 27.3 | — |
| 6% cobalt naphthenate (Celanese Corp.) | 0.18 | — |
| manganese naphthenate (Mooney Chemical) | 0.14 | — |
| methyl ethyl ketoxime (Tenneco Chemical Exkin 2) | 0.8 | — |
| propylene glycol monomethyl ether acetate (Dow Chemical PM acetate) | 13.6 | 28 |
| xylene | 8.5 | — |
| talc (Cyprus Minerals Mistron Monomix) | 17.0 | — |
| dicyandiamide | — | 36 |

The components of each of the compositions A and B were dispersed by grinding to a particle size of 6 on the Hegman Scale.

Compositions A and B were combined in amounts of 100 g and 120 g, respectively, along with 20 g of the acrylic acid copolymer and 10 g of the phenolic resin solution to produce resin coating system sample no. 1 containing 17.3% dicyandiamide. Six additional different resin systems were prepared by combining different amounts of compositions A and B to produce resin system samples 2 through 7 containing dicyandiamide in the following respective amounts: 8.6%, 4.3%, 2.9%, 0.8%, 0.12% and 0.015%. Additional amounts of the aforementioned resins and pigments were added as necessary to maintain an approximately equal ratio of pigment to resin throughout the different resin systems. A control sample resin system was prepared in the same pigment to resin ratio, but without any dicyandiamide. Table I shows the compositions of the aforementioned samples.

The eight different liquid resin coating systems (seven with dicyandiamide corrosion inhibitor, one control) were applied to the copper layer on the backs of the aforementioned mirrored glass samples using a draw down bar and thereafter infrared drying at about 250° F. (120° C.) for approximately five (5) minutes until cured to a hardened film layer of approximately 0.001 in. (25 microns) thickness.

The coated mirror samples were then subjected to a corrosion test in a 20% salt spray environment for 150 hours pursuant to Federal specification DD-M-00411 b. Following completion of the test the mirrors were evaluated for corrosion by noting the appearance of the silver (and other film layers) from the front of the mirror.

TABLE 1

| | Samples (in parts by weight) | | | | | | | |
|---|---|---|---|---|---|---|---|---|
| | 1 | 2 | 3 | 4 | 5 | 6 | 7 | Control |
| Composition A | 100.0 | 100.0 | 100.0 | 100.0 | 100.0 | 100.0 | 100.0 | 100.0 |
| Composition B | 120.0 | 60.0 | 30.0 | 20.0 | 5.0 | 0.8 | 0.11 | — |
| acrylic-alkyd copolymer | 20.0 | 41.6 | 52.4 | 56.0 | 61.4 | 62.9 | 63.16 | 63.2 |
| phenolic resin solution | 10.0 | 10.0 | 10.0 | 10.0 | 10.0 | 10.0 | 10.0 | 10.0 |
| propylene glycol monomethyl ether acetate | — | 16.8 | 25.2 | 28.0 | 32.2 | 33.37 | 33.58 | 33.6 |
| Talc | — | 21.6 | 32.4 | 36.0 | 41.4 | 42.9 | 43.16 | 43.2 |

TABLE II

| Sample | wt. % Dicyandiamide | black edge (mm) | density of spots | spot size |
|---|---|---|---|---|
| 1 | 17.3 | Total Failure (clear glass) | | |
| 2 | 8.6 | 1 mm | dense | 1-2 mm |
| 3 | 4.3 | 0.3 mm | medium | pin points |
| 4 | 2.9 | 0.3 mm | very few | pin points |
| 5 | 0.8 | 0.3 mm | medium | faint pin points |
| 6 | 0.12 | 0.3 mm | medium | large spots |
| 7 | 0.015 | Total Failure (film still attached) | | |
| Control | 0.0 | Total Failure (clear glass) | | |

Both the control sample and the sample having the 17.3% dicyandiamide resin showed complete failure of the metal film layers as they and the resin film layer had peeled off the glass layer. The samples having the 2.9% and 0.8% dicyandiamide resin had very good appearance with only fine pinpoints visible on the silver film layer and minimal corrosion at the mirror edges. The samples having the 8.6%, 4.3%, 0.12% and 0.015% dicyandiamide resin showed corrosion between the two extremes described above. The results of the salt spray test are shown in Table II. Except for the sample having the 17.3% dicyandiamide resin, the presence of dicyandiamide in the resin system resulted in marked improvement in corrosion testing, as compared to the control sample having no dicyandiamide. This is best shown by the reduced edge creep on the mirror samples. It is believed that the failure of the sample having the 17.3% dicyandiamide resin resulted from reaction of the dicyandiamide with water, which reaction may be prevented by use of a water or moisture proof top coat over the resin system of the present invention.

The aforementioned examples of resin systems including the dicyandiamide corrosion inhibitor of the present invention may be further modified, for example, by including other pigments such as zinc oxide or titanium dioxide in part replacement for the talc, or by using additional resin in part replacement for the pigments to achieve better corrosion resistance. In addition to protection of film layers of mirrors, as described above, the dicyandiamide containing resins of the present invention may be applied to and over metallic surface layers, such as copper, copper-based alloys, silver, or silver based alloys of other articles to provide enhanced corrosion protection.

While the invention has been described with reference to specific embodiments, it will be recognized by those skilled in the art that variations are possible without departing from the spirit and scope of the invention, and that it is intended to cover all changes and modifications of the invention disclosed herein for the purposes of illustration which do not constitute departure from the spirit and scope of the invention.

Having thus described the invention, what is claimed is:

1. A composition comprising a fluid organic resin-containing system which of itself, without the addition of dicyandiamide or metal or acid salts thereof, is capable of being fully hardened under heating conditions to form a cured coating over a metallic film which would provide relatively ineffective corrosion protection for that metallic film to which has been added dicyandiamide or metal or acid salts thereof to obtain a modified organic resin coating system providing a film capable of inhibiting corrosion of a metallic film layer on mirror backs.

2. The composition of claim 1 wherein said resin system includes an organic resin selected from the group consisting of alkyd resins, acrylic resins, modified alkyd resins, polyester, urethane oils, vinyl halide polymers or copolymers, oleoresinous varnishes, nitrocellulose compositions, phenolformaldehyde resin varnishes, melamine formaldehyde resins, urea formaldehyde resins, epoxy resins and combinations of the above.

3. The composition of claim 1 wherein said dicyandiamide or metal or acid salts thereof is present in an amount of about 0.1 to 20 weight percent of said organic resin coating system.

4. The composition of claim 1 wherein said coating system is lead-free.

5. The composition of claim 1 wherein said corrosion inhibitor is present in an amount of about 0.5 to 5 weight percent of said organic resin coating system.

6. The composition of claim 1 wherein dicyandiamide has been added to obtain said modified organic resin coating system.

7. The composition of claim 1 wherein a metal or acid salt of dicyandiamide has been added to obtain said modified organic resin coating system.

8. The composition of claim 1 wherein said organic resin coating system is selected from the group consisting of alkyd resins, modified alkyd resins, urea formaldehyde resins, and combinations thereof.

9. The composition of claim 8 wherein dicyandiamide has been added to obtain said modified organic resin coating system.

10. The composition of claim 9 wherein said dicyandiamide is present in an amount of about 0.1 to 20 weight percent of said organic resin coating system.

11. The composition of claim 8 wherein a metal or acid salt of dicyandiamide has been added to obtain said modified organic resin coating system.

12. The composition of claim 11 wherein said dicyandiamide is present in an amount of about 0.1 to 20 weight percent of said organic resin coating system.

13. A composition for inhibiting corrosion of a metallic film layer on mirror backs comprising a fluid organic resin coating system capable of being applied as film and hardening to form a protective layer over said metallic film layer, said resin system including an organic resin selected from the group consisting of alkyd resins, acrylic resins, modified alkyd resins, polyester, urethane oils, vinyl halide polymers or copolymers, oleoresinous varnishes, nitrocellulose compositions, phenolformaldehyde resin varnishes, melamine formaldehyde resins, urea formaldehyde resins and combinations of the above, and a corrosion inhibitor selected from the group consisting of dicyandiamide and metal or acid salts thereof.

14. The composition of claim 13 wherein said corrosion inhibitor is present in an amount of about 0.1 to 20% weight percent of said organic resin coating system.

15. The composition of claim 13 wherein said coating system is lead-free.

16. The composition of claim 13 wherein said corrosion inhibitor is present in an amount of about 0.5 to 5 weight percent of said organic resin coating system.

17. The composition of claim 13 wherein said corrosion inhibitor is present in an amount of about 0.1 to 10 weight percent of said organic resin coating system.

18. The composition of claim 13 wherein said corrosion inhibitor is dicyandiamide.

19. The composition of claim 13 wherein said corrosion inhibitor is a metal or acid salt of dicyandiamide.

20. The composition of claim 13 wherein said organic resin coating system is selected from the group consisting of alkyd resins, modified alkyd resins, acrylic resins, melamine formaldehyde resins, urea formaldehyde resins, and combinations thereof.

21. The composition of claim 20 wherein said corrosion inhibitor is dicyandiamide.

22. The composition of claim 21 wherein said composition is essentially lead-free.

23. The composition of claim 20 wherein said corrosion inhibitor is a metal or acid salt of dicyandiamide.

24. The composition of claim 23 wherein said composition is essentially lead-free.

25. The composition of claim 13 wherein said composition is essentially lead-free.

26. The composition of claim 25 wherein said organic resin coating system is selected from the group consisting of alkyd resins, modified alkyd resins, acrylic resins, polyesters and combinations thereof.

27. The composition of claim 25 wherein said organic resin coating system is selected from the group consisting of alkyd resins, modified alkyd resins, melamine formaldehyde resins, and combinations thereof.

28. The composition of claim 19 wherein said composition is essentially lead-free.

29. The composition of claim 28 wherein said organic resin coating system is selected from the group consisting of alkyd resins, modified alkyd resins, acrylic resins, polyesters and combinations thereof.

30. The composition of claim 28 wherein said organic resin coating system is selected from the group consisting of alkyd resins, modified alkyd resins, melamine formaldehyde resins, and combinations thereof.

31. A composition for inhibiting corrosion of a metallic surface comprising a liquid organic resin coating system capable of being applied as a film and hardening to form a protective layer over said metallic surface, said resin system including an organic resin selected from the group consisting of alkyd resins, modified alkyd resins, acrylic resins, melamine formaldehyde resins, urea formaldehyde resins, and combinations thereof, and containing a corrosion inhibitor selected from the group consisting of dicyandiamide and metal or acid salts thereof.

32. The composition of claim 31 wherein said corrosion inhibitor is present in an amount of about 0.1 to 10 weight percent of said organic resin coating system.

33. The composition of claim 31 wherein said corrosion inhibitor is present in an amount of about 0.5 to 5 weight percent of said organic resin coating system.

34. The composition of claim 32 wherein said corrosion inhibitor is dicyandiamide.

35. The composition of claim 34 wherein said composition is essentially lead-free.

36. The composition of claim 32 wherein said corrosion inhibitor is a metal or acid salt of dicyandiamide.

37. The composition of claim 36 wherein said composition is essentially lead-free.

38. A composition for providing a protective coating layer over a metallic surface comprising an essentially lead-free, cured organic resin coating system, said organic resin coating system being selected from the group consisting of alkyd resins, modified alkyd resins, acrylic resins, polyesters, urethane oils, vinyl halide polymers or copolymers, oleoresinous varnishes, nitrocellulose compositions, phenolformaldehyde resin varnishes, melamine formaldehyde resins, urea formaldehyde resins, and combinations thereof, and a corrosion inhibitor in an amount of about 0.01 to 20 weight percent selected from the group consisting of dicyandiamide and metal or acid salts thereof.

39. The composition of claim 38 wherein said corrosion inhibitor is present in an amount of about 0.5 to 5 weight percent of said organic resin coating system.

40. The composition of claim 38 wherein said corrosion inhibitor is dicyandiamide.

41. The composition of claim 40 wherein said organic resin coating system is selected from the group consisting of alkyd resins, modified alkyd resins, acrylic resins, melamine formaldehyde resins, urea formaldehyde resins, and combinations thereof.

42. The composition of claim 38 wherein said corrosion inhibitor is a metal or acid salt of dicyandiamide.

43. The composition of claim 42 wherein said organic resin coating system is selected from the group consisting of alkyd resins, modified alkyd resins, acrylic resins, melamine formaldehyde resins, urea formaldehyde resins, and combinations thereof.

* * * * *